United States Patent Office 2,840,137
Patented June 24, 1958

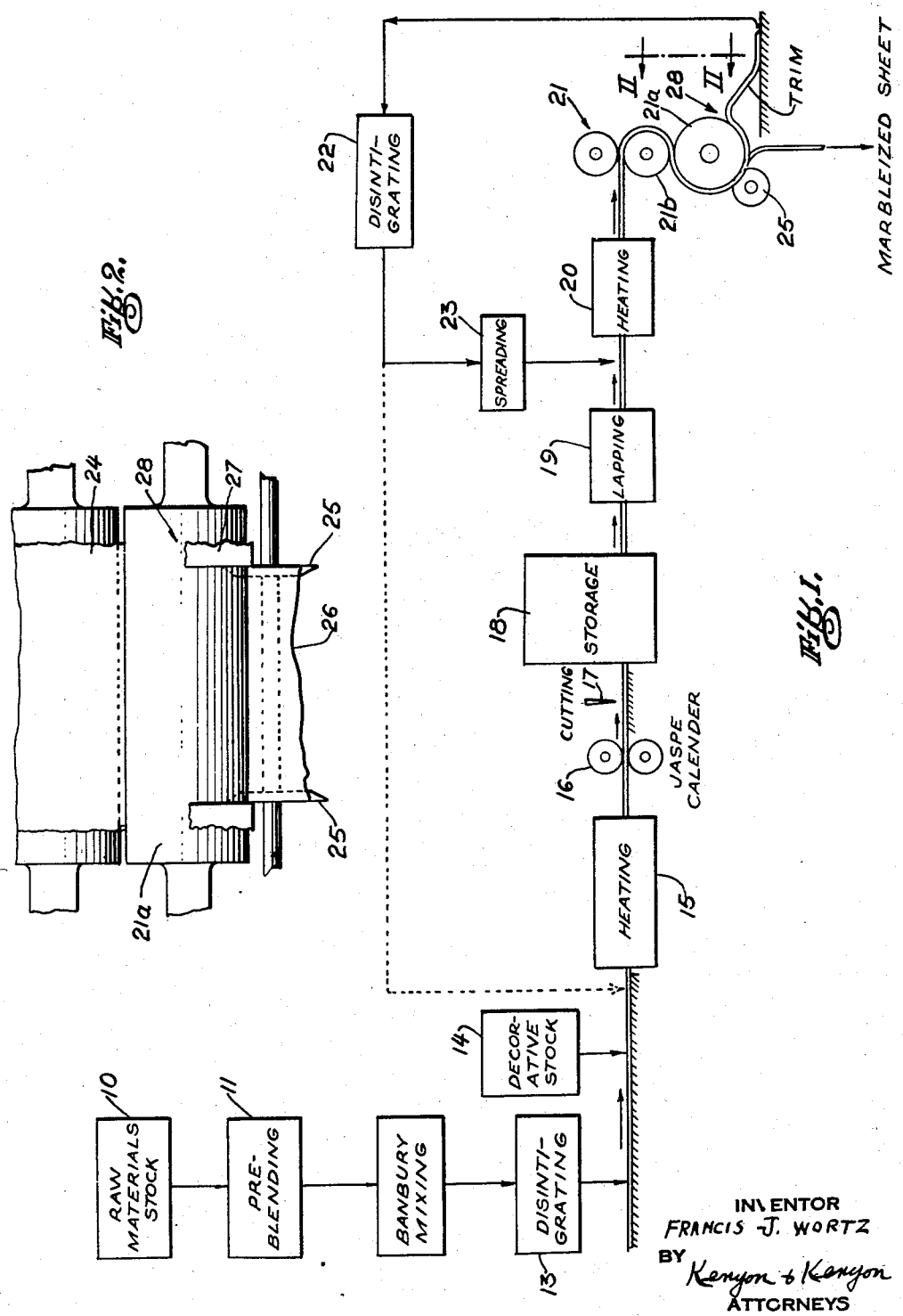

2,840,137

METHOD FOR PRODUCING CALENDERED COMPOSITION SHEET

Francis J. Wortz, Newport, Del., assignor to Congoleum-Nairn Inc., a corporation of New York Application May 5, 1954, Serial No. 427,755

4 Claims. (Cl. 154—25)

This invention relates to method and apparatus for producing calendered composition sheets and relates more particularly to method and apparatus for producing calendered sheets of composition material which are adapted to provide the decorative and wear-resistant surface layer of flexible smooth-surface coverings for floors, walls, articles of furniture and the like. This invention is of a special utility in the production of calendered sheets of composition material which are of variegated appearance, e. g., simulated marble.

Calendered sheets of composition material having variegated appearance have been extensively produced by calendering a composition which comprises zones of different color distributed therein. The composition material is calendered while in a plastic and workable consistency and during calendering the zones of different color become distributed so as to produce a variegated appearance. The most common products of this type are those having a jaspe appearance and those having a marbleized appearance. Usually the products having a marbleized appearance are produced after having first gone through the jaspe stage.

In typical operations of the character in question the raw materials which make up the composition for providing the background color are initially commingled and thoroughly mixed as by the use of a Banbury mixing machine. After the composition having the desired color has thus been mixed, it is reduced to small pieces which are adapted to retain their integrity to such extent as to permit their being intermingled with similar pieces having one or more additional colors that likewise largely retain their integrity. In most coverings the bulk of the calendered sheet is composed of composition material that provides the background color and only a minor proportion, e. g., about 5% to 30%, is in the form of added decorative stock. However, in any case the pieces of different color are commingled and the commingled pieces while plastic and workable are subjected to calendering. The result of such calendering is to produce a jaspe appearance, namely, streaks of contrasting color in the direction of the passage of the sheet through the calender.

A calendered marbleized sheet can be produced from the calendered jaspe sheet by cutting the calendered jaspe sheet into lengths usually about twice the width of the original jaspe sheet. These lengths are turned 90° and are lapped with one another for feeding into a calender which is effective to calender the lapped sheets in a direction transverse to the direction of the jaspe streaks. In this calendering operation the jaspe streaks are spread out and the desired marbleized effect is produced.

When a plastic composition having zones of different color distributed therein is subjected to calendering, difficulties have been encountered due to the fact that the marginal portions of the calendered sheet are not identical in appearance with the main central portion of the calendered sheet. Adjacent the margins of the calendered sheet there is a tendency for the plastic material to be moved laterally during calendering instead of being worked merely backward from the bite of the calender rolls as the plastic composition material passes through the calender. Since the movement of the plastic is different along the margins, the appearance which results from the working of the pieces of different color in the composition material is substantially different than it is in the main body portion of the calendered sheet. This difference in appearance is due principally to differences in the design effect of the outlines between areas of contrasting color. However, the different nature of the working of the plastic material along the margins likewise tends to result in more complete mixing and therefore a more homogeneous color effect than that which occurs in the main body portion of the calendered sheet. Because of the faulty appearance along the margins of the calendered sheets of variegated appearance it has been common practice to trim off the margins and utilize only the main body portion of the calendered sheet from which the marginal trim has been separated.

Generally the amount of marginal trim is quite substantial, namely, in the neighborhood of about 5% to about 17% by weight of the calendered sheet as initially formed. Since the material cost of the ingredients contained in the marginal trim is substantial, it is of economic advantage to use the marginal trim rather than to discard it as worthless waste. In the past, use of the marginal trim has been effected by storing the separated marginal trim until such time as there is another run with which the trim can be worked into the virgin materials employed either in producing the composition providing the background color or in any of the compositions used as decorative stock. In other words, the marginal trim is taken to storage and then when a compatible mix is to be prepared the marginal trim is mixed with the virgin materials in the Banbury mixer at the start of the operation.

The matter of storage of the marginal trim is a relatively serious one. Most manufacturers of floor and wall coverings produce quite a wide selection of patterns and color combinations and because of this fact no one composition formulation is repeatedly run at frequent intervals, and by reason of such circumstances it is quite commonly the case that marginal trim has to be stored for a month or two before another pattern is run with which it may be utilized in producing a composition of desired color. Accordingly, the amount of marginal trim that is kept in storage may become very large, e. g., several hundred thousand pounds. Moreover, in the case of a composition such as linoleum composition, if the marginal trim is permitted to remain in storage too long it becomes aged excessively, with the result that it cannot be successfully salvaged by blending it with fresh linoleum composition.

In connection with the foregoing, it is also noteworthy that there are several steps leading up to the marbleizing step which require equipment, power, and labor. When marginal trim is removed from the marbleizing calender, for example, it is apparent that the cost of processing it is lost and that while the cost in raw material can be salvaged by reworking the marginal trim, the expense incident to such reworking is pure waste that by like amount reduces the value of the salvaged ingredients. Moreover, the reworking of the trim cuts down the capacity of the equipment prior to final calendering, for the output of the final calendering is less than the input of raw materials processed by the amount of salvaged trim that is returned for reworking.

It is an object of this invention to provide improved method and apparatus for utilizing the marginal trim that is produced in calendering a sheet of composition material such as a marbleized sheet.

It is a further object of this invention to increase the operating efficiency of method and apparatus for making calendered sheets of variegated appearance such as those comprised in marbleized floor and wall coverings.

A further object of this invention is to provide method and apparatus for producing a calendered sheet of variegated appearance such as a marbleized sheet in such a way as to provide more efficient utilization of plant facilities both from the point of view of more efficient use of machinery and from the point of view of minimizing storage.

It is a further object of this invention to obtain the aforesaid improvements without sacrifice as regards the quality and appearance of the calendered sheet product.

According to this invention, marginal trim may be used immediately, as fast as it is formed and without impairing quality and appearance, by distributing it in the form of small pieces with the composition material being fed into a calender, the composition material together with the pieces of marginal trim being reduced to about the same plastic consistency either just prior to or during calendering. In distributing the marginal trim with the plastic composition material being fed into the calender, the pieces are sufficiently low in surface area as not to substantially modify the color and appearance of the plastic composition which enters the calender, as compared with its color and appearance in the absence of the added reused marginal trim. On the other hand, the pieces of marginal trim are not of such excessively large size that their entity is apparent to the eye in the calendered sheet. The marginal trim may be reduced to the pieces of desired size by any suitable means such as a hammer mill or the equivalent. If the calendering is performed at some temperature other than ordinary atmospheric temperature, the pieces of marginal trim may be brought to a temperature corresponding to the rest of the composition material that is being calendered. For example, in the case of vinyl composition which is calendered at elevated temperature the pieces produced by disintegrating the marginal trim can be heated to substantially the same temperature as that of the vinyl composition to which it is added either prior to or during calendering.

Further objects, features and advantages of this invention will be apparent in connection with the description of an illustrative example of the practice of this invention in connection with the accompanying drawings, wherein:

Fig. 1 is a schematic flow diagram of a typical system and apparatus for producing a marbleized calendered sheet of vinyl composition wherein the method and apparatus of this invention are incorporated; and Fig. 2 is a front elevation showing the lower calender roll of the 3-roll marbleizing calender of Fig. 1 taken from the line II—II, the disposition of plastic composition material calendered thereon being in accordance with typical practice of this invention.

Preferred practice of this invention may be illustrated in connection with the production of a marbleized calendered sheet of vinyl composition suitable for providing the decorative wear-resistant layer of a floor or wall covering. Any type of vinyl composition suitable for such coverings may be utilized and several such compositions of preferred formulation comprising vinyl resin, plasticizer and filler are disclosed in Patent No. 2,558,378.

Referring to Fig. 1, the raw materials source is indicated at 10 and the raw materials optionally may be subjected to preblending at 11. The raw materials are subjected to heat and powerful mixing at 12, which is marked "Banbury Mixing." At this stage the commingled ingredients may advantageously be heated to temperatures of at least about 300° F. so that desired workability may be obtained for accomplishing a thorough mixing of the vinyl resin, plasticizer and filler. After the Banbury mixing the mass is subjected to the disintegrating step which is indicated at 13. Any suitable means for disintegrating the mixed vinyl composition may be employed. For example, the mixed composition discharged from the Banbury mixing step may first be formed into a sheet which is then broken up into small pieces that may be, for example, about 1/16 inch to 1/4 inch thick, about 1/8 inch to 1/2 inch long and about 1/16 inch to 1/4 inch wide. This is conventional practice and the size of the pieces will depend to substantial extent on the appearance desired.

The foregoing operations are typical of producing the composition material which is to provide the background color in the finished goods. There may be mixed with the so-formed pieces other pieces of similar or other desired size but having a contrasting color, such other pieces being taken from the decorative stock supply indicated at 14. The pieces of different color are mixed together and since the temperature thereof usually becomes reduced below that desired for calendering, the pieces of different color may be subjected to the heating step indicated at 15. This heating step can advantageously be performed while the pieces are laterally spread out on a conveyor or similar means whereby they are fed into the jaspe calender 16. Usually the pieces of vinyl composition are heated so that the jaspe calendering step will be performed at a temperature of about 300° F. to about 350° F. Typically, during the jaspe calendering step, a sheet is produced which is about 0.01 to about 0.13 inch in thickness and more usually 0.03 to about 0.07 inch and wherein the pieces or zones of different color have been elongated to form the striations that are typical of a jaspe sheet.

While the manufacturing operation may be carried on continuously through the jaspe step and thence through the marbleizing step, it is normally the practice to carry out those steps up to and through the jaspe calendering as one continuous operation and thereafter to carry out those steps which result in the production of a marbleized calendered sheet as a separate operation. As above mentioned, the marbleizing effect is normally produced by lapping and cross-calendering the jaspe calendered sheet. The lengths which are lapped prior to cross-calendering may be cut at the cutting step indicated at 17 which follows the jaspe calendering step. Typically, the jaspe sheet is cut into lengths which are a few inches longer than the desired width of the sheet to be cross-calendered and which, for example, may be about 80 to 84 inches long. The resulting sheets may then be taken to storage, indicated at 18, before being lapped and cross-calendered to produce the marbleized effect. The lapping step is indicated at 19 and comprises turning the lengths 90° so that the lapped lengths are subsequently calendered transversely to the direction of jaspe streak formation. The lapped sheets may, for example, be built up as a result of the lapping so as to be approximately 0.02 inch to approximately 0.25 inch in thickness and more usually 0.06 inch to about 0.14 inch. The vinyl composition must be brought to a temperature appropriate for calendering and this may be accomplished by the heating step indicated at 20 that may be conveniently effected while the lapped lengths are being conveyed to the marbleizing calender, which is indicated generally by the reference character 21, and by which the calendering is effected at some suitable temperature that may be of the order of from about 225° F. to about 350° F. and more generally under those conditions that are appropriate for the particular marbleized appearance to be produced. The heating prior to calendering usually is such that the vinyl composition is heated to a temperature within the aforesaid calendering temperature range. The resultant calendered sheet may be about 0.01 inch to about 0.13 inch in thickness and more usually 0.03 inch to about 0.07 inch.

The foregoing has been described as typical in the manufacture of a marbleized calendered sheet of vinyl composition. When such an operation is carried out the desired width of the marbleized calendered sheet to be produced may, for example, be about 73 to 74 inches, although marbleized calendered sheets having other desired widths may likewise be produced as desired. So that a calendered sheet of desired width may be produced having a satisfactory appearance throughout, it has been conventional practice to calender a sheet which is substantially wider than the width desired for the commercial product and then trim off each margin a strip which may be from about 2 inches to about 7 inches in width depending on such factors as the thickness and plasticity of the calendered sheet, and the degree of marginal design perfection desired. As stated hereinabove, it has been usual practice heretofore to take the marginal trim that is produced to storage and subsequently work it up as such or with additional raw materials into a mass of homogeneous color that is used whenever some pattern is produced in which stock having the color of the reworked trim can be utilized. According to this invention, the marginal trim instead of being taken to storage and used in the manner described is immediately taken to a disintegrating machine, which is indicated at 22. The disintegrating machine advantageously may be a conventional hammer mill which is adapted to reduce the trim to pieces which are preferably such as to average about ⅛ inch to ½ inch in lateral dimension, while being of a thickness corresponding to the thickness of the sheet taken off the marbleizing calender. The disintegrating step may be carried out at any desired temperature, although if the calendering is carried out at an elevated temperature of the character aforesaid it normally is desirable that the disintegrating step be carried out without waiting for the trim to cool to atmospheric temperature and so that the amount of reheating of the disintegrated trim may be reduced to a minimum. If the separated marginal trim is taken directly to the disintegrating machine from the marbleizing calender, the normal result is that the disintegration step takes place when the trim is at a temperature of the order of 150° to 175° F.

The pieces of disintegrated marginal trim normally are utilized at the rate they are produced by directing them to a spreading device, indicated at 23, by which they are spread substantially uniformly over the surface of the lapped lengths of jaspe sheet material being fed into the marbleizing calender. During calendering the added pieces of marginal trim having the variegated composition and appearance of the trimmed off margins of the calendered sheet are deformed but retain their variegated composition and appearance, and while they contribute to the surface of the calendered sheet on which they are spread prior to calendering, their own variegated nature so blends with the variegated nature of the sheet stock being calendered that for many production items there is no appreciable effect on the appearance of the product, that is if the pieces are of the size range hereinabove stated. The nature of the action is to be contrasted with that of prior practice wherein trim has been reworked with virgin material to make a composition of homogeneous color or with attempting to produce a usable variegated sheet merely by sheeting out the trim.

Any suitable type of spreading device of conventional design may be employed for the purpose. For example, a vibrating feeder may be used which is adapted to advance the pieces of disintegrated trim so as to be deposited uniformly across the lateral extent of the lapped lengths of jaspe sheet material as the latter are advanced toward the marbleizing calender. Alternatively, an oscillating arm type of feeder could be used. It is a feature of preferred practice of this invention that when the lapped lengths of jaspe sheet material are subjected to the heating step indicated at 20 prior to being introduced into the marbleizing calender 21 the pieces of disintegrated trim are spread on the lapped lengths of jaspe sheet material so as to be subjected to the same heating step 20 whereby the pieces of disintegrated marginal trim and the lapped lengths of jaspe sheet material are both brought to the desired temperature for calendering by a single operation using common equipment. However, substantially the same result could be obtained by separately heating the pieces of disintegrated marginal trim and spreading the heated pieces on the lapped lengths of jaspe sheet material following the heating step 20 and just prior to introducing the lapped lengths of jaspe sheet material into the marbleizing calender 21.

While it is preferable not only to heat the lapped lengths of jaspe sheet material but also either simultaneously or separately the pieces of disintegrated marginal trim, it is not essential that the pieces of disintegrated marginal trim be heated prior to their entry into the marbleizing calender while spread on the surface of the lapped lengths of jaspe sheet material, for their proportion in relation to the total plastic composition entering the marbleizing calender is such that they can be brought to proper workable consistency in relation to the rest of the material undergoing calendering merely by virtue of the heat contained in the mass while it is being worked as it passes through the calender, especially when the marbleizing calender is a 3-roll calender, as indicated in Fig. 1. In such case a slightly greater amount of heat could be supplied to the marbleizing calender rolls in an amount corresponding to the heat which is utilized in bringing the pieces of disintegrated marginal scrap from their temperature after disintegration to desired calendering temperature. The calendar rolls comprised in the marbleizing calender may be of conventional type whereby the surface temperature may be controlled as by use of fluid media passed through the interior of hollow rolls. Accordingly, the temperature of the calender rolls can be controlled so that the vinyl composition undergoing calendering will be maintained at the proper temperature for providing a calendered sheet having the desired appearance, whether the pieces of disintegrated marginal trim are or are not heated after disintegration prior to incorporation in the vinyl plastic composition that is being worked upon as it passes through the marbleizing calender.

While it is preferable that the pieces of disintegrated marginal trim shall be such that the lateral dimensions thereof will be about ⅛ to ½ inch, the pieces of disintegrated scrap may vary substantially from such size. However, if the marginal trim is disintegrated so that the pieces are too small, then their surface area becomes so large that there is a tendency to discolor the product. For this reason it is desirable that not more than about 10% by weight of the supply of disintegrated marginal trim that is used be such as to pass a ⅛ inch screen. On the other hand, so as to avoid the presence of pieces whose entity is discernible to the eye in the finished product, it is desirable that not more than about 10% by weight of the supply of disintegrated scrap that is used be such as to be retained on a ½ inch screen. The size of the pieces produced by disintegrating the marginal trim likewise is preferably related to the character of the marbleized sheet produced by the marbleizing calender. If relatively coarse pieces are used in producing the original jaspe sheet with the result that the marbleized pattern is on a relatively large scale, then the pieces of disintegrated marginal trim may run larger than is preferable when the variegations which make up the marbleized appearance are on a relatively small scale. When reference is made to a screen such as a ⅛ inch screen or a ½ inch screen, the reference is to a screen having square openings of the dimension stated. When it is said that the particles either pass or are retained on such a screen, the reference is to the capacity or lack of capacity to pass through square openings of the dimension stated. Further in this connection, the product of disintegration is in the form of pieces and even in the case of the pieces of larger size they are not longer than about one inch and preferably the lateral dimensions of the pieces are nearly the same in every direction. Normally, the process is carried out so that the thickness of the pieces corresponds at least roughly to that of the marginal trim as it is taken off the marbleizing calender.

Control of the marginal trim and its separation from the calender and the balance of the calendered sheet is illustrated in Fig. 2 which is a diagrammatic representation on a larger scale of the bottom roll 21a of the 3-roll calender 21. In passing through the 3-roll calender 21, the sheet material is carried by the surface on the right-hand side by the center roll 21b and then is transferred to and is carried by the surface on the left-hand side of the bottom roll 21a, as these rolls are viewed in Fig. 1. The calendered sheet as it is received by the roll 21a is shown at the top of Fig. 2 and is there indicated by the reference character 24. As the calendered sheet is carried by the roll 21a it passes the cutting means indicated diagrammatically in Fig. 1 at 25 which separates from the central body portion 26 that is taken off the roll 21a as indicated in Fig. 2 the marginal strips 27 that are taken off the roll 21a at some suitable point, e. g., at 28, as indicated diagrammatically in Figs. 1 and 2. Merely by way of illustration, if the central body portion 26 is about 73 or 74 inches in width, each of the marginal trim strips 27 may be about 2 to about 5 inches in width. However, as mentioned above, the width of the calendered sheet may be varied as desired and the width of the strips of marginal trim may be as much as about 7 inches. Preferably in the practice of this invention the pieces of disintegrated trim that are distributed across the feed into the calender do not constitute more than about 10% by weight of the calendered sheet that is formed and the width of the marginal trim strips is such as not to exceed this amount. The amount of disintegrated trim that may advantageously be calendered into the sheet being formed by calendering varies substantially depending upon the colors and color proportions of the pattern of the product being produced. While there is a number of product patterns in connection with which the proportional amount of the calendered sheet provided by the added pieces of trim may exceed about 10% without noticeably affecting the pattern appearance as compared with the pattern appearance that results when no trim pieces are used, there are other product patterns which are so affected to some extent and if in such case the amount of trim is in excess of that which modifies the appearance when reused according to this invention, then only part of the trim may be so reused in the operation being carried out and another part may be taken to storage and later used according to this invention by distributing it substantially uniformly with the feed into calender rolls of composition material comprising zones corresponding in color, relative amount and composition with those comprised in the marginal trim. On the other hand, the desired pattern appearance of the finished product need not necessarily be identical with the pattern appearance that results in the absence of distributing any of the pieces of disintegrated trim into the feed of the calender rolls and if the desired appearance of the finished product takes into account any such possible effect of reuse of marginal trim according to this invention the amount of marginal trim that is so used may run as high as 17% by weight of the calendered sheet being produced, or even higher. However, it is usually sufficient to hold the amount of margin trim down to about 10% or less by weight of the calendered sheet from which it is taken and desired control can more advantageously be exercised when the disintegrated trim does not amount to more than about 10%. It usually is preferable that the reused pieces of the disintegrated trim do not cover more than about 50% of the exposed surface of the material being fed in sheet or other laterally distributed form into the calendering operation.

By carrying out the manufacture of marbleized calendered sheet material as hereinabove described, the marginal trim which is produced preferably is utilized continuously and as fast as it is produced by trimming it from the marbleized sheet product taken from the marbleizing calender and because of this fact there is no storage problem nor any problem as regards utilization of the trim being dependent upon the particular composition used in processing at some later date. Another advantage of the practice of this invention is that the capacity of the equipment that is used in carrying the operations through the jaspe calendering step is increased as regards the amount of virgin raw materials that are handled thereby. It is usual practice, as stated hereinabove, to carry out the operations through the jaspe calendering step and then store the jaspe calendered sheet for subsequently cross-calendering lapped lengths thereof in the production of the marbleized product. If, as in the past, the marginal trim is stored and then reworked by introducing it into the Banbury mixing step, it is apparent that the amount of virgin raw materials which can be handled in the Banbury mixing step and in subsequent processing steps is correspondingly reduced. For example, when the marginal trim constitutes about 5% to about 17% by weight of the marbleized calendered sheet, the return of this amount of trim for processing during the Banbury mixing and subsequent operations reduces by a corresponding extent the capacity of the equipment for producing jaspe calendered sheets from virgin raw materials.

In addition to the foregoing, substantial savings are realized in other ways. In carrying out the various steps involved in the production of marbleized calendered sheets, there is a substantial amount of expense for power, labor, heat and equipment maintenance for each pound of composition material that is processed. By avoiding the passage of marginal trim a second time through the series of operations from the Banbury mixing up to the point where the disintegrated marginal trim is spread on the composition material being fed into the marbleizing calender, the cost per pound for processing the material in each of the operations involved that is saved is applicable to the number of pounds of marginal trim which is separated from the marbleized sheet product.

While it is normally preferable to utilize the pieces of disintegrated marginal trim by spreading them on the composition material as it is being fed into the calender from which the marginal trim is taken, as illustrated in solid lines in Fig. 1, the pieces of disintegrated marginal trim could, if desired, be reintroduced into the supply of composition material being fed into the jaspe calender, as indicated by the dotted lines in Fig. 1. If the pieces of disintegrated marginal trim are used in this way the foregoing discussion is applicable to the pieces being spread onto the laterally disposed feed of composition material into the jaspe calender either before or after the composition material is subjected to the heating step indicated at 15, and either with or without heating. If desired, the pieces of disintegrated marginal trim could be introduced into the system along with the addition of the decorative stock. While it is possible to carry out the invention in this way, it is normally much less desirable to do so when the final product is to be of the marbleized type. Normally, unless the system is being carried out continuously without storage of the jaspe sheet prior to marbleizing, the chances are that in normal practice the jaspe calender would not be in use for the manufacture of the particular marbleized pattern which is being formed on the marbleizing calender. In such case, severe limitations are placed on the possibility of returning the pieces of disintegrated marginal trim to the jaspe calender and storage problems are presented. Moreover, to the extent that the pieces of marginal trim are taken back to the portion of the system wherein the jaspe sheet is produced, the capacity of the jaspe calender is correspondingly reduced and the cost for reworking the pieces of disintegrated marginal trim in such steps is added to the overall cost for producing the marbleized sheet.

While this invention has been described in connection with the production of a calendered sheet of vinyl composition having a marbleized appearance, this invention may also be practiced using compositions other than vinyl composition which are of such plasticity and workability as to be adapted for being formed into a sheet by calendering. For example, essentially those steps which have been described hereinabove and illustrated in connection with Fig. 1 may be employed in making calendered marbleized sheets of linoleum composition. However, since linoleum composition is normally processed at atmospheric temperatures or thereabouts, no heating steps are required for heating the composition so as to impart thereto sufficient plasticity and workability to permit the composition to be successfully calendered.

The steps indicated in Fig. 1 and described hereinabove are those which are most widely used in the production of calendered sheets of composition material having a marbleized appearance. However, it has heretofore been proposed to produce a marbleized appearance by first producing a calendered sheet of composition material having the desired background color and then applying pieces of decorative stock thereto prior to further calendering which has the effect of producing a marbleized appearance. In such case, this invention can likewise be utilized for the purpose of re-introducing into the system the marginal trim from the marbleizing calender.

While this invention is especially applicable in connection with the production of calendered sheets having a marbleized appearance, this invention can likewise be practiced whenever a composition material comprising zones of different color is calendered to produce a calendered sheet having a variegated appearance. For example, if the final calendered sheet is to be one having a jaspe appearance, marginal trim can be separated from the recovered central body of the calendered sheet produced by the jaspe calender and taken to a disintegrator from which the pieces of disintegrated marginal trim are taken so as to be spread over the surface of the composition material being fed into the jaspe calender. If the jaspe calendering is conducted at elevated temperatures, then the pieces of disintegrated marginal trim may be re-introduced without reheating or may be reheated separately, or may be heated simultaneously with the plastic composition material being fed into the jaspe calender. When producing a jaspe calendered sheet as the final product, the calendering technique is usually somewhat different from that which is utilized when the jaspe sheet is initially prepared only for use in cross-calendering to produce a marbleized sheet, the calender unit utilized in making a jaspe sheet at the final product generally being such as to accomplish two reductions under those temperature conditions which are suitable for attaining the particular decorative effect desired. It may also be mentioned that by utilizing relatively high temperatures for the roll surface in contact with one of the surfaces of the sheet, usually the back, a jaspe effect can be also produced on the surface of the so heated roll when cross-calendering using the marbleizing calender. What has been said hereinabove as regards the size of the pieces of disintegrated marginal trim is likewise applicable when the invention is utilized in connection with the manufacture of calendered sheet material having a jaspe appearance as the final product. However, when making a jaspe calendered sheet disintegrated trim particles of somewhat larger size can be tolerated as compared with calendering a marbleized sheet, although it normally is undesirable in producing a jaspe sheet to employ disintegrated trim particles that are substantially larger in size than the particles of composition which constitute the base color or decorative stock being fed to the jaspe calendering step. In any case, the pieces that are utilized have the variegated nature of the calendered sheet of which they were originally a part such as marbleized or jaspe, and while the feed to the calendering operation with which they are distributed may not be identical as exemplified by the fact that pieces of marbleized trim may be distributed with the feed into either the marbleizing calender or the jaspe calender, nevertheless the pieces comprise different zones while in color, relative amount and composition correspond with those comprised in the feed to the calender with the result that the added pieces, because of their size, distribution and minor amount, become merged during the calendering in a matrix which corresponds in the respects mentioned so that their identity is not apparent and their presence does not substantially modify the over-all uniformity and variegated design characteristics that otherwise are obtainable.

In connection with the foregoing description, it is to be understood that the steps and the equipment used therein which have been described are illustrative. Thus, while it is usually preferable to effect disintegration of the marginal trim using a hammer mill, other known disintegrating devices may be used. For example, the marginal trim could be reduced to the form of pieces having the size desired by using a device such as a dicer which is adapted to convert the marginal trim into small pieces by chopping. Similar comments are applicable to the disintegrating step and equipment which follows the Banbury mixing and any type of disintegrating equipment which is conventionally used or which is the equivalent thereof may be utilized. For example, a frequent practice in the manufacture of linoleum to effect the disintegration of linoleum composition by extrusion of the linoleum composition through openings about ¼ inch in diameter for producing rods which become broken up into pieces about 1 inch in length that are taken to the jaspe calender after having been commingled with similarly produced pieces of decorative stock. Moreover, while this invention has been described in connection with the re-utilization of the marginal trim taken from the calender during production of variegated calendered sheets, other trim or scrap from such calendered sheets which may result from some subsequent operation, e. g., tile cutting, may be re-utilized as hereinabove described and is to be regarded as comprised in the term "trim" as this term is used herein and in the claims.

I claim:

1. A method of making a marbleized sheet of composition material adapted for use as the wear-resistant surface layer of a flexible, smooth surface covering for floors and walls which comprises feeding to a calender lapped lengths of jaspe sheet material, calendering said lapped lengths transversely with respect to the jaspe streaks, whereby said streaks become distorted in passing through said calender to produce a calendered sheet having a wear surface with a marbleized appearance, separating marginal trim from the resulting calendered sheet, disintegrating said marginal trim to produce a supply of discrete pieces thereof not more than about 10 percent by weight of which passes a ⅛ inch screen and not more than about 10 percent by weight of which is retained on a ½ inch screen, and distributing said supply of pieces substantially uniformly across the lapped lengths of calendered jaspe sheet material being fed into said calender in an amount ranging from about 5 percent to about 17 percent by weight of the calendered sheet produced, thereby producing a calendered sheet containing the calendered trim in the wear surface and having a uniform marbleized appearance similar to that of the sheet from which the trim was separated.

2. The method according to claim 1 wherein said composition material is vinyl resinous composition, said lapped lengths are fed into said calender while at a temperature between about 225° F. and about 350° F., said disintegration of marginal trim is effected at a temperature substantially below the calendering temperature, and the pieces of disintegrated marginal trim are reheated so as to be at approximately the temperature of said lapped lengths when said lapped lengths and said pieces are fed into said calender.

3. In a method of producing a surface covering for floors and walls which has a uniform variegated decorative appearance comprising feeding sheeted plastic composition material comprising zones of different color distributed therein in plastic workable consistency to a calender and calendering said sheeted composition material to produce a calendered sheet bearing a wearing surface with said variegated appearance, the improvement which comprises distributing uniformly over the surface of said sheeted composition material so as to cover not more than about 50 percent of the surface area thereof discrete pieces of plastic composition material having exposed decorated surfaces which correspond to said variegated appearance, said pieces being of such a size range that not more than about 10 percent by weight of the pieces passes a ⅛ inch screen and not more than about 10 percent of the pieces is retained on the ½ inch screen and said pieces being of the same workable consistency as that of said sheeted composition material, thereby forming a calendered sheet having the calendered pieces in the wearing surface, said wearing surface having said variegated decorative appearance being uninfluenced by the presence of said calendered pieces.

4. The method according to claim 3 wherein said discrete pieces of plastic composition material are produced by disintegrating marginal trim cut from said calendered sheet.

References Cited in the file of this patent

UNITED STATES PATENTS

| | | |
|---|---|---|
| 793,782 | Godfrey | July 4, 1905 |
| 1,215,382 | Kempel | Feb. 13, 1917 |
| 1,391,932 | Beckwith et al. | Sept. 27, 1921 |
| 1,506,235 | Godfrey | Aug. 26, 1924 |
| 1,741,488 | Veit | Dec. 31, 1929 |
| 1,975,883 | Veit | Oct. 9, 1934 |
| 2,083,201 | Poppe | June 8, 1937 |
| 2,368,475 | Kemmler | Jan. 30, 1945 |
| 2,691,796 | Emig | Oct. 19, 1954 |

FOREIGN PATENTS

| | | |
|---|---|---|
| 405,876 | Great Britain | Feb. 15, 1934 |
| 669,937 | Great Britain | Aug. 23, 1949 |
| 675,663 | Great Britain | July 16, 1952 |